Patented Nov. 9, 1937

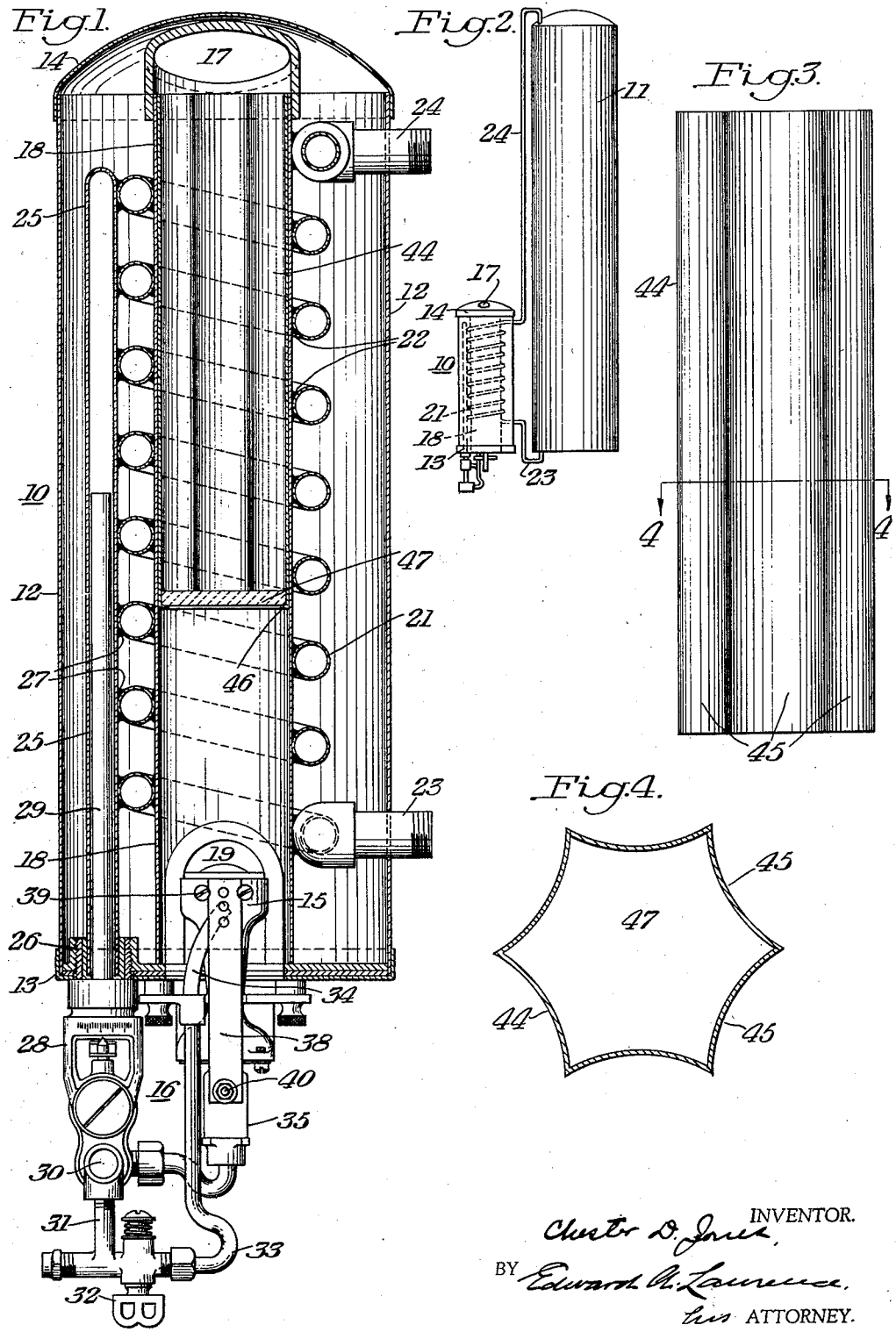

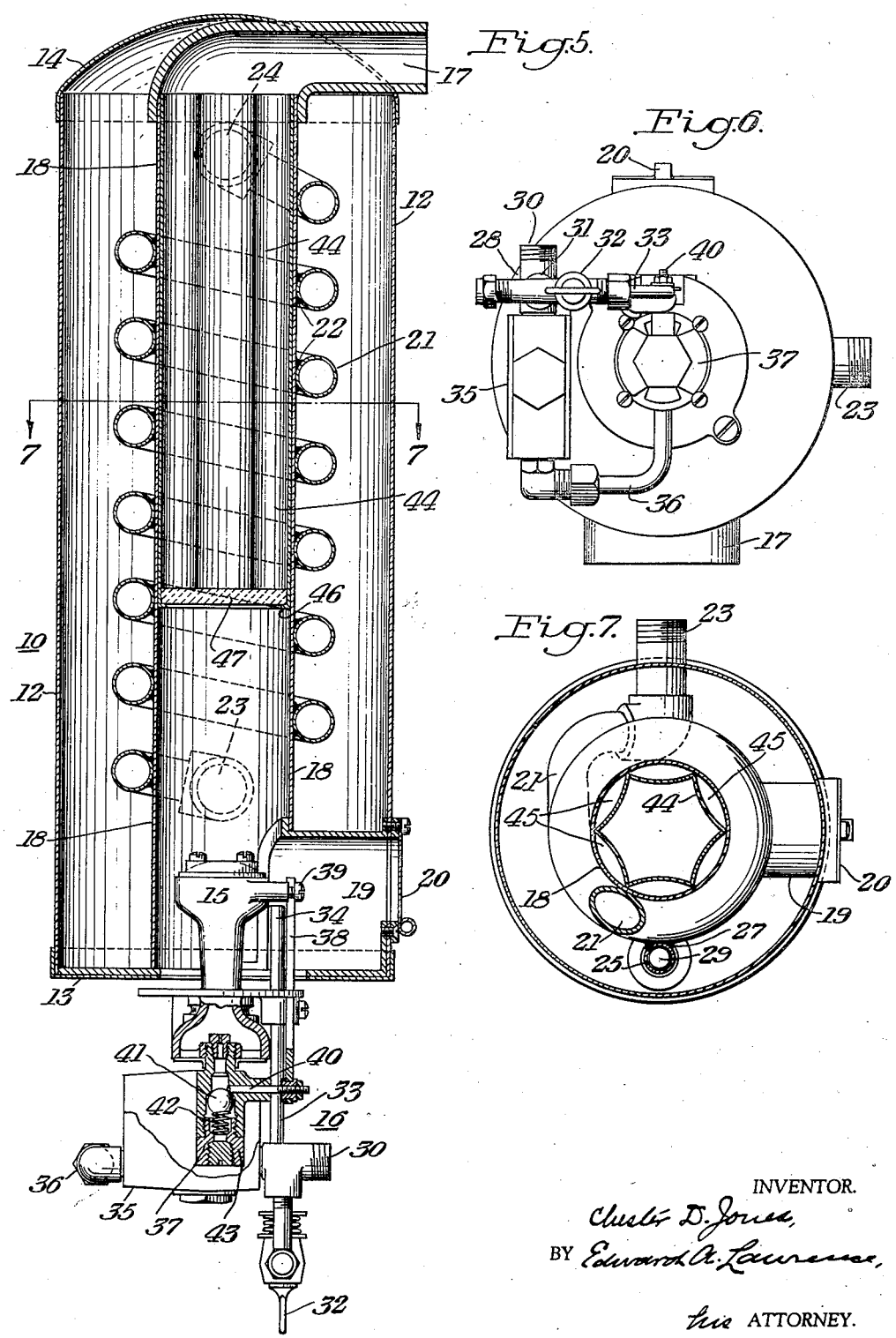

2,098,498

UNITED STATES PATENT OFFICE 2,098,498

FLUID HEATER

Chester D. Jones, Carnegie, Pa., assignor to The Pittsburg Water Heater Corporation, Pittsburgh, Pa., a corporation of Pennsylvania Application February 6, 1936, Serial No. 62,668

2 Claims. (Cl. 236—33)

My invention relates generally to fluid heaters and more particularly to the method and manner of maintaining a constant temperature of a fluid to be stored by controlling the temperature of the fluid at the time heat is transferred thereto.

The invention may be conveniently applied to liquid heaters and has an advantageous application to slow recovery water heaters wherein a storage tank and a side heater are employed.

In the present practice of slow recovery heaters the temperature of the water stored within a tank is maintained through the provision of a thermostatic element disposed within the tank and arranged to control the flow of fuel to the burner which may be at the bottom of the tank or in a side coil unit within the immediate vicinity thereof. It is thus necessary to pipe the fuel to the thermostatic control valve on the tank and thence to the heater unit. Aside from the couplings, fittings and pipe required to make such an installation there remains a quantity of fuel in the pipe line after the flow thereof has been cut off by the thermostatic valve. This quantity of fuel burns out after the thermostat has stopped the flow thereof and creates a time delay in the operation of the burner.

The principal object of this invention is the provision of a simplified and economical arrangement for controlling the temperature of the stored fluid by controlling the heat input to a small portion of the fluid which is permitted to circulate through the zone of heat transfer. This arrangement permits the temperature controlling device to be placed adjacent the heat generator or burner, thereby eliminating many parts and also the time delay in the operation of the burner.

Another object is the provision of a baffle member in the combustion chamber of the heat generating means that enhances the heat absorption of the fluid being heated and thereby aids in the control of the temperature thereof.

Another object is control of the fuel supply by the temperature of the fluid in the heater coils and more particularly length or extent of the coils.

Other advantages and objects will appear in the following description.

In the accompanying drawings, wherein I have illustrated a practical embodiment of the principles of my invention;

Fig. 1 is a vertical sectional view of a side heater showing the application of the control thermostat, the baffle member and other associated parts.

Fig. 2 is a diagrammatic view showing the side heater as applied to a storage tank.

Fig. 3 is a side elevation of the baffle structure.

Fig. 4 is a sectional view of the baffle taken along the lines 4—4 of Fig. 3.

Fig. 5 is a vertical section taken in a plane at right angles to the plane in Fig. 1.

Fig. 6 is an inverted plan view of the side heater.

Fig. 7 is a sectional view taken along the line 7—7 of Fig. 5.

Referring to the drawings, 10 represents a heat generating unit arranged to be connected with a water storage tank 11 to which water is supplied and withdrawn for service according to the demand. The heat generating unit comprises the tubular shell 12 which is closed at each end by the caps 13 and 14. The lower cap 13 is arranged to receive and support the fuel burner 15 and the control means which are generally designated as 16. The upper cap 14 is arranged to vent the products of combustion, as by a flue vent 17.

The shell 12 is provided with an inner concentric tubular member 18 which encases the burner 15 at its lower end and is connected at its upper end with the flue vent 17. The member 18 forms the combustion chamber of the heating unit, and it is provided with a walled passage 19 at the lower end which extends to a doorway at the exterior of the shell 12, giving access to the burner for lighting the device. The outer end of the passageway 19 is provided with a door or closure member 20, as shown in Fig. 5.

21 represents a pipe coil preferably made of high heat conductive material, such as copper, and which is wound around the exterior of the tubular member 18 and secured thereto in surface contact, as by soldering or other suitable means indicated at 22. This coil is arranged to be connected at its lower and upper ends to the storage tank 11 by means of pipes 23 and 24, as shown in Fig. 2, and the coil is arranged to carry the water for the purpose of transmitting heat thereto. The heated water will circulate from the bottom of the tank to the top thereof through the coil, owing to the relative difference in the heat thereof. This type of circulation is generally known as the gravity system.

It will be noted that in the case of my invention the transfer of heat to the fluid in the coil 21 is accomplished throughout the entire length or extent of the coil.

25 represents a thermostat tube or casing, preferably made of highly conductive material such as copper, and closed at its top. The bottom of the tube, which is open, is secured to the plug 26. The tube is positioned longitudinally of the tubular member 18 and is secured to the consecutive turns of the coil 21 at their points of tangency with the tube 25 by means of the solder 27 or by other convenient means. The tubular member 18, the coil 21 and the tube 25 are thus assembled as a single unit, permitting the transfer of heat by conductivity to be more effective therebetween. The tube 25 extends and is in conductive relation to the full extent of the coil 21.

28 represents the thermostatic valve-operating mechanism which controls the flow of fuel fed to the burner. Extending upwardly from this mechanism into the tube 25 are the thermostatic elements 29. These elements are made of material having different coefficients of expansion and thereby produce a relative movement in accordance with the temperature to which they are exposed. This movement is transmitted to the valve operating mechanism and arranged to control the passage of fuel accordingly in the well known manner. Therefore these elements are not specifically described.

The fuel circuit may be traced as follows:—
Upon entering the port 30 the fuel divides and a part thereof passes down through the pipe 31, the "B" cock 32, the pipe 33 to the pilot light 34 which is directly below one side of the burner 15. The other portion of the fuel passes through the valve mechanism 35 of the thermostatic mechanism 28, the pipe 36, the safety pilot valve mechanism 37, thence to the burner 15, as indicated in Figs. 5 and 6.

38 represents a bimetallic element mounted on the burner 15 by means of the screws 39 and arranged to be operated by the heat of the pilot light 34 which is immediately adjacent thereto. The heat of the pilot light causes the lower free end of the bimetallic element to flex toward the burner, moving the pinch bar 40 against the upper surface of the ball valve 41 forcing it down against the pressure of its seating spring 42, thereby permitting the fuel to pass from the chamber 43 of the pilot valve mechanism to the burner 15. This bimetallic valve switch is known in the art as a safety pilot valve which permits the fuel to be fed to the burner only when the pilot is lighted.

44 represents a tubular baffle member of substantially hexagonal cross sectional shape which is secured within the upper portion of the combustion chamber by being welded or otherwise secured to the wall of the member 18. Each of the six sides of the member are concaved inwardly as shown, and thus form with the perimetral wall of the combustion chamber six individual flues 45. The lower end of the baffle member is inturned to form a flange 46 upon which is supported the closure-plate 47 which is preferably made of refractory material, such as fire clay, as it is positioned above the burner 15 in the path of the flames. This plate directs the products of combustion toward the sides of the combustion chamber where they are vented by the flues 45 to the vent flue 17. The heat of the products of combustion is thus directed to flues 45 which induces heat transmission through the wall of the combustion chamber 18 to the coil 21, heating the fluid in the coil. Heat is also conducted to the tube 25 for actuating the thermostatic elements 29, thus controlling the application of heat to the fluid. The quantity of fluid passing through the coil 21 has a pronounced effect upon the heat effective on the thermostat for the coil is cooled by the fluid which traverses it and absorbs heat therefrom. Thus accurate control of the temperature of the fluid is maintained, because the actual temperature of the fluid throughout the extent of the coil 21 is the ultimate controlling factor in the operation of the thermostatic mechanism.

I claim:—

1. In a liquid heater, the combination of a coil through which the liquid passes as it is being heated, a tubular sheath isolated from the liquid and fixed to a plurality of turns of the coil for direct heat conduction to said sheath throughout the heat absorption length thereof, and a thermostatic element within the sheath and arranged to control the application of heat to the coil.

2. In a liquid heater, the combination of a tubular combustion chamber, a coil through which the liquid passes as it is being heated, said coil being disposed about the combustion chamber and in direct heat conductivity with the wall thereof, a tubular sheath isolated from the liquid and fixed to a plurality of turns of the coil for direct heat conduction to said sheath throughout the heat absorption length thereof, and a thermostatic element within the sheath and arranged to control the application of heat to the coil.

CHESTER D. JONES.